(12) United States Patent
Arikawa et al.

(10) Patent No.: US 6,897,252 B2
(45) Date of Patent: May 24, 2005

(54) AQUEOUS DISPERSION COMPOSITION FOR IMPARTING CHIPPING RESISTANCE

(75) Inventors: Hideo Arikawa, Chiba (JP); Suguru Tokita, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 103 days.

(21) Appl. No.: 10/088,996

(22) PCT Filed: Jul. 27, 2001

(86) PCT No.: PCT/JP01/06497

§ 371 (c)(1),
(2), (4) Date: Mar. 26, 2002

(87) PCT Pub. No.: WO02/10296

PCT Pub. Date: Feb. 7, 2002

(65) Prior Publication Data

US 2002/0198298 A1 Dec. 26, 2002

(30) Foreign Application Priority Data

Jul. 31, 2000 (JP) ........................................ 2000-230765
Dec. 13, 2000 (JP) ........................................ 2000-379152

(51) Int. Cl.⁷ ................................................. C08L 5/17
(52) U.S. Cl. ........................ 524/244; 524/245; 524/300; 524/575; 524/515; 524/525
(58) Field of Search ................................ 524/277, 539, 524/522, 525, 529, 533

(56) References Cited

U.S. PATENT DOCUMENTS

| | | | | |
|---|---|---|---|---|
| 3,720,637 A | * | 3/1973 | Bacskai | 524/549 |
| 3,872,037 A | * | 3/1975 | MacLeod | 524/26 |
| 3,988,275 A | * | 10/1976 | Satake et al. | 260/23 R |
| 4,097,551 A | * | 6/1978 | DiGiulio et al. | 525/71 |
| 4,174,335 A | * | 11/1979 | Ohdaira et al. | 260/29.6 RW |
| 4,201,848 A | * | 5/1980 | Kotani et al. | 525/314 |
| 4,413,068 A | * | 11/1983 | Sinclair et al. | 523/201 |
| 4,434,208 A | * | 2/1984 | Girgis | 428/378 |
| 4,537,926 A | * | 8/1985 | Kivel et al. | 524/388 |
| 4,554,083 A | * | 11/1985 | Soldanski et al. | 252/8.57 |
| 5,578,674 A | * | 11/1996 | Speth et al. | 524/575 |
| 5,670,263 A | * | 9/1997 | Gazeley | 428/492 |
| 5,948,860 A | * | 9/1999 | Hiraoka et al. | 525/74 |
| 6,448,321 B1 | * | 9/2002 | Tokita | 524/394 |

FOREIGN PATENT DOCUMENTS

| | | | | |
|---|---|---|---|---|
| EP | 0 972 794 A1 | | 1/2000 | |
| JP | 51-012835 A | | 1/1975 | |
| JP | 54-30246 A | * | 3/1979 | ........... C08L/53/02 |
| JP | 06-184465 A | | 7/1994 | |
| JP | 07-166093 A | | 6/1995 | |
| JP | 2000-160059 A | | 6/2000 | |
| JP | 2000-160094 A | | 6/2000 | |
| JP | 2000-345097 A | | 12/2000 | |

* cited by examiner

*Primary Examiner*—David W. Wu
*Assistant Examiner*—Rip A. Lee
(74) *Attorney, Agent, or Firm*—Burns, Doane, Swecker & Mathis, L.L.P.

(57) ABSTRACT

Disclosed is a chipping resistance-imparting aqueous dispersion composition comprising a nonvolatile component (film-forming component) dispersed in water, said nonvolatile component containing an olefin thermoplastic elastomer or a styrene/conjugated diene block copolymer or its hydrogenation product. A coating film obtained by the use of the aqueous dispersion composition as an aqueous primer or an additive to a water paint is excellent in chipping resistance as well as in other properties such as film appearance, adhesion properties, heat resistance, moisture resistance and gasoline resistance.

3 Claims, No Drawings

AQUEOUS DISPERSION COMPOSITION FOR IMPARTING CHIPPING RESISTANCE

FIELD OF THE INVENTION

The present invention relates to an aqueous dispersion composition for imparting chipping resistance to water paints. More particularly, the present invention relates to an aqueous dispersion composition for imparting chipping resistance to water paint films, said chipping resistance being a property that a paint film such as an automotive outer plate paint film is hardly broken or marred even if scattering stones or the like strike the film.

BACKGROUND OF THE INVENTION

Automotive outer plate painting is usually carried out by first electrodepositing an undercoating material on a steel plate, applying a solvent type intermediate coating material and then applying a top coating material to form a composite coating film. In recent years, according to the requirements for the market, it becomes a major theme to change the coating materials into functional ones capable of allowing the whole coating film to have chipping resistance (property that a paint film is hardly broken or marred even if a stone or the like strikes the film surface). To obtain the chipping resistance, a method of allowing the intermediate coating material to have softness or a method of introducing a solvent type resin primer having softness between the undercoating material and the intermediate coating material has been studied and put into practical use.

Since the solvent in the solvent type coating material evaporates into the atmosphere to form a coating film, there are problems from the viewpoint of the recent global environmental conservation and from the viewpoint of evil influence of the organic solvent on human beings such as workers. Hence, development of solvent-free type coating materials has been desired for a long time.

Under such circumstances, there have been made attempts to develop high-solid content coating materials (coating materials having extremely low solvent content) as the solvent type coating materials and to develop water paints or powder coatings as substitutes for the solvent type coating materials. Particularly, waterpaints, wherein all the solvents are water, use no organic solvent at all, so that they can become eco-friendly paints.

However, it is difficult to impart chipping resistance to coating films obtained from the water paints, and only a method of introducing a soft component into a skeleton of a resin for a water paint or a method of lowering crosslink density of a crosslinking coating material has been mainly carried out heretofore. As a result, a problem of lowering the various properties of a coating film per se, such as strength, hot water resistance and mar resistance has occurred.

DISCLOSURE OF THE INVENTION

Accordingly, it is an object of the present invention to provide a chipping resistance-imparting aqueous dispersion composition capable of solving the above-mentioned problems, and more particularly, it is an object of the present invention to provide an aqueous dispersion composition employable as an aqueous primer or an additive to a water paint and capable of imparting chipping resistance to a paint film of a water paint with maintaining appearance of the paint film.

The chipping resistance-imparting aqueous dispersion composition of the invention is an aqueous composition and does not substantially contain an organic solvent.

According to the first invention, there is provided:
a chipping resistance-imparting aqueous dispersion composition comprising a nonvolatile component (film-forming component) dispersed in water, said nonvolatile component containing an olefin thermoplastic elastomer (a).

According to the second invention, there is provided:
the chipping resistance-imparting aqueous dispersion composition of the first invention, which further comprises at least one compound (b) selected from the group consisting of a carboxylic acid-modified thermoplastic polymer (b-1) and a fatty acid compound (b-2) in an amount of 0.5 to 20 parts by weight based on 100 parts by weight of the olefin thermoplastic elastomer (a).

According to the third invention, there is provided:
the chipping resistance-imparting aqueous dispersion composition of the first or the second invention, which further comprises a nitrogen compound (c) represented by the following formula (I) in an amount of 0.1 to 30 parts by weight based on 100 parts by weight of the olefin thermoplastic elastomer (a),

wherein $R^1$ is a group represented by $-(CH_2-CH_2O)_m-H$ (m is 1 to 10), and $R^2$ is a group or an atom selected from the group consisting of a group represented by $-(CH_2-CH_2O)_n-H$ (n is 1 to 10), an alkyl group of 1 to 10 carbon atoms, an aryl group and a hydrogen atom.

According to the fourth invention, there is provided:
a chipping resistance-imparting aqueous dispersion composition comprising a nonvolatile component (film-forming component) dispersed in water, said nonvolatile component containing a styrene/conjugated diene block copolymer or its hydrogenation product (a').

According to the fifth invention, there is provided:
the chipping resistance-imparting aqueous dispersion composition of the fourth invention, which further comprises at least one compound (b') selected from the group consisting of a carboxylic acid-modified thermoplastic polymer (b-1), a fatty acid compound (b-2) and a styrene/unsaturated acid compound copolymer (b-3) in an amount of 0.5 to 20 parts by weight based on 100 parts by weight of the styrene/conjugated diene block copolymer or its hydrogenation product (a').

According to the sixth invention, there is provided:
the chipping resistance-imparting aqueous dispersion composition of the fourth or the fifth invention, which further comprises a nitrogen compound (c) represented by the following formula (I) in an amount of 0.1 to 30 parts by weight based on 100 parts by weight of the styrene/conjugated diene block copolymer or its hydrogenation product (a'),

wherein $R^1$ is a group represented by $-(CH_2-CH_2O)_m-H$ (m is 1 to 10), and $R^2$ is a group or an atom selected from the group consisting of a group represented by $-(CH_2-CH_2O)_n-H$ (n is 1 to 10), an alkyl group of 1 to 10 carbon atoms, an aryl group and a hydrogen atom.

PREFERRED EMBODIMENTS OF THE INVENTION

Details of the chipping resistance-imparting aqueous dispersion composition according to the present invention are described hereinafter.

(a) Olefin Thermoplastic Elastomer

Examples of the olefin thermoplastic elastomers (a) for use in the invention include:

elastomers obtained by blending (co)polymers of one or more α-olefins (e.g., ethylene, propylene, 1-butene, 3-methyl-1-butene, 3-methyl-1-pentene, 4-methyl-1-pentene, 1-heptene, 1-hexene, 1-octene, 1-decene and 1-dodecene), such as polyethylene, polypropylene, poly-1-butene, poly-3-methyl-1-butene, poly-3-methyl-1-pentene, poly-4-methyl-1-pentene, an ethylene/propylene copolymer, an ethylene/1-butene copolymer and a propylene/1-butene copolymer, with olefin thermoplastic elastomers containing diene components, such as an ethylene/propylene/diene copolymer rubber (EPDM);

elastomers comprising copolymers of two or more α-olefins (e.g., ethylene, propylene, 1-butene, 3-methyl-1-butene, 3-methyl-1-pentene, 4-methyl-1-pentene, 1-heptene, 1-hexene, 1-octene, 1-decene and 1-dodecene), such as an ethylene/propylene copolymer, an ethylene/1-butene copolymer and a propylene/1-butene copolymer;

copolymer elastomers of α-olefins and conjugated dienes or nonconjugated dienes, such as an ethylene/butadiene copolymer and an ethylene/ethylidene norbornene copolymer; and polyolefin elastomers, e.g., copolymers of two or more α-olefins and conjugated or nonconjugated dienes, such as an ethylene/propylene/butadiene copolymer, an ethylene/propylene/dicyclopentadiene copolymer and an ethylene/propylene/1,5-hexadiene copolymer.

These elastomers can be used singly or as a mixture.

Of the above elastomers, preferable is a copolymer of ethylene and one or more α-olefins other than ethylene.

The molecular weight of the olefin thermoplastic elastomer (a) depends upon the type of the olefin monomer constituting the elastomer or the type of the elastomer (e.g., copolymer or blend) and cannot be defined absolutely, but for example, the melt flow rate (abbreviated to "MFR" hereinafter) as measured at 230° C. in accordance with ASTM D 1238 is in the range of preferably 0.1 to 500 g/10 min, more preferably 0.4 to 300 g/10 min.

(a') Styrene/Conjugated Diene Block Copolymer or its Hydrogenation Product

The conjugated diene constituting the styrene/conjugated diene block copolymer or its hydrogenation product (a') for use in another embodiment of the chipping resistance-imparting aqueous dispersion composition according to the invention is, for example, isoprene or butadiene. In the block copolymer, one or more kinds of the conjugated dienes may be contained.

As the block structure of the styrene/conjugated diene block copolymer, there can be mentioned a diblock copolymer of styrene and a conjugated diene, a triblock copolymer of styrene, a conjugated diene and styrene, or a block copolymer having more blocks.

Examples of the conjugated diene block copolymers include those prepared by the processes described in U.S. Pat. No. 3,265,765, Japanese Patent Laid-Open Publication No. 192743/1986, etc. Specifically, there can be mentioned Crayton TR-1107, 1111, 1112 (all available from Shell Chemicals) as commercially available styrene/isoprene block copolymers.

Examples of the hydrogenation products of the styrene/conjugated diene block copolymers include those prepared by the processes described in Japanese Patent Laid-Open Publication No. 20504/1970, Japanese Patent Publication No. 3555/1973, etc. Specifically, there can be mentioned Crayton G-1652, 1657 (all available from Shell Chemicals) as commercially available ones wherein the conjugated diene is butadiene, Toughtec H1141 (available from Asahi Chemical Industry Co., Ltd.) as a commercially available one wherein the conjugated diene is butadiene, and Septon 2002, 2007 (all available from Kuraray Co., Ltd.) as commercially available ones wherein the conjugated diene is isoprene.

The styrene content (content of recurring units derived from styrene) in the styrene/conjugated diene block copolymer or its hydrogenation product is in the range of preferably 10 to 70% by weight, more preferably 20 to 50% by weight, from the viewpoints of impartation of chipping resistance and surface appearance properties of the coating film. MFR of the styrene/conjugated diene block copolymer or its hydrogenation product, as measured at 230° C. in accordance with ASTM D 1238, is in the range of preferably 0.1 to 1000 g/10 min, more preferably 1 to 500 g/10 min.

(b-1) Carboxylic Acid-modified Thermoplastic Polymer

The carboxylic acid-modified thermoplastic polymer (b-1) of the invention is prepared by introducing a monomer having a neutralized or unneutralized carboxylic acid group or a monomer having a saponified or unsaponified carboxylic acid ester group into an α-olefin homopolymer or copolymer (sometimes referred to as an "α-olefin (co)polymer" hereinafter) or an α-olefin constituting the α-olefin (co)polymer by graft copolymerization, block copolymerization or random copolymerization, or in some cases by conducting neutralization reaction or saponification reaction using a basic substance so as to convert a part of or all of the —COO— groups bonded to a polymer chain of the polymer into carboxylic acid salt. The polymer may be a partially neutralized or partially saponified one in which an unneutralized or unsaponified carboxylic acid group or carboxylic acid ester group is present.

The carboxylic acid-modified thermoplastic polymer (b-1) is, for example, a polymer obtained by copolymerization of an α-olefin and an ethylenically unsaturated carboxylic acid, an anhydride thereof or an ester thereof, or a polymer obtained by graft polymerization of an α-olefin (co)polymer with an ethylenically unsaturated carboxylic acid, an anhydride thereof or an unsaturated ester thereof.

Examples of the α-olefin (co)polymers include (co) polymers of ethylene, propylene, butene, pentene, hexene and octene. Of these, an ethylene homopolymer and an ethylene/propylene copolymer are preferable.

Examples of the ethylenically unsaturated carboxylic acids include (meth)acrylic acid, maleic acid, fumaric acid, tetrahydrophthalic acid, itaconic acid, citraconic acid, crotonic acid and isocrotonic acid. Examples of the anhydrides of the ethylenically unsaturated carboxylic acids include nadic anhydride™ (bicyclo[2,2,1]hept-5-ene-2,3-dicarboxylic anhydride), maleic anhydride and citraconic anhydride.

Examples of the unsaturated carboxylic acid esters include monoesters and diesters of the above-mentioned unsaturated carboxylic acids, such as methyl, ethyl and propyl esters of the above-mentioned unsaturated carboxylic acids. These monomers can be used singly or in combination of plural kinds.

For the graft polymerization of the α-olefin (co)polymer with the ethylenically unsaturated carboxylic acid, an anhydride thereof or an unsaturated ester thereof, various processes hitherto known are available. For example, a process comprising melting the α-olefin (co)polymer and adding a graft monomer to perform graft polymerization and a process comprising dissolving the α-olefin (co)polymer in a solvent and adding a graft monomer to perform graft polymerization are employable. In either process, it is preferable to carry out the reaction in the presence of a radical reaction initiator in order to efficiently graft the graft monomer on the polymer.

The graft polymerization is carried out at a temperature of usually 60 to 350° C., preferably 100 to 200° C. The radical initiator is used in an amount of usually 0.01 to 10 parts by weight based on 100 parts by weight of the α-olefin (co)polymer. Examples of the radical initiators include organic peroxides, organic peresters and azo compounds. Of these radical initiators, preferable are dialkyl peroxides, such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene.

The monomer, such as the ethylenically unsaturated carboxylic acid, its anhydride or its ester, is introduced into the polymer in an amount of preferably 0.01 to 10 mmol equivalents, particularly preferably 0.1 to 5 mmol equivalents, in terms of —COO— group, based on 1 g of the polymer.

The molecular weight of the carboxylic acid-modified thermoplastic polymer (b-1) is desired to be in the range of 0.005 to 5 dl/g, preferably 0.01 to 3 dl/g, when expressed in terms of intrinsic viscosity $[\eta]$ (135° C., solvent: decalin).

The basic substance used for neutralization or saponification of the carboxylic acid-modified thermoplastic polymer (b-1) is, for example, a substance functioning as a base in water, such as an alkali metal, an alkaline earth metal, ammonia or amine, a substance functioning also as a base in water, such as an oxide, a hydroxide, a weak base or a hydride of an alkali metal, or an oxide, a hydroxide, a weak base or a hydride of an alkaline earth metal, or an alkoxide of the alkali metal or the alkaline earth metal.

Examples of the alkali metals include sodium, potassium and lithium. Examples of the alkaline earth metals include calcium, strontium, barium and magnesium.

Examples of the oxides, hydroxides and hydrides of alkali metals or alkaline earth metals include sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydride, potassium hydride and calcium hydride.

Examples of the weak bases of alkali metals or alkaline earth metals include sodium carbonate, potassium carbonate, sodium hydrogencarbonate, calcium hydrogencarbonate, sodium acetate, potassium acetate and calcium acetate.

Examples of the ammonia compounds and the amine compounds include inorganic amines, such as hydroxylamine and hydrazine; methylamine, ethylamine, ethanolamine, cyclohexylamine; quaternary ammonium compounds, such as ammonium hydroxide and tetramethylammonium hydroxide; and hydrazine hydrate.

Preferred examples of the carboxylic acid salts having been neutralized or saponified with the basic substance include alkali metal salts of carboxylic acids, such as sodium carboxylate and potassium carboxylate; and ammonium carboxylate.

The neutralization or the saponification of the carboxylic acid-modified thermoplastic polymer (b-1) can be carried out using a basic substance in an amount of 20 to 200 equivalents, preferably 20 to 100 equivalents, based on 100 equivalents of the whole carboxylic acid or carboxylic acid ester in the polymer.

(b-2) Fatty Acid Compound

The fatty acid compound (b-2) for use in the invention is a compound having 25 to 60 carbon atoms, preferably 25 to 40 carbon atoms, and having a neutralized or unneutralized carboxylic acid group or a saponified or unsaponified carboxylic acid ester group. Examples of such compounds include montanic acid, montanic acid ester and montan wax.

The amount of the neutralized or unneutralized carboxylic acid group or the saponified or unsaponified carboxylic acid ester group in the fatty acid compound (b-2) is in the range of preferably 0.01 to 10 mmol equivalents, particularly preferably 0.1 to 5 mmol equivalents, in terms of —COO— group, based on 1 g of the fatty acid compound.

The molecular weight is desired to be in the range of 0.005 to 5 dl/g, preferably 0.01 to 3 dl/g, when expressed in terms of intrinsic viscosity $[\eta]$ (135° C., solvent: decalin).

The basic substance used for the neutralization and the saponification is the same basic substance as used for the neutralization and the saponification of the above carboxylic acid-modified thermoplastic polymer (b-1).

(b-3) Styrene/Unsaturated Acid Compound Copolymer

The styrene/unsaturated acid compound copolymer (b-3) for use in the invention is prepared by introducing a monomer having a neutralized or unneutralized carboxylic acid group or a monomer having a saponified or unsaponified carboxylic acid ester group into a styrene monomer and/or a styrene (co)polymer by graft copolymerization, block copolymerization or random copolymerization, or in some cases by conducting neutralization reaction or saponification reaction using a basic substance so as to convert a part of or all of the —COO— groups bonded to a polymer chain of the polymer into carboxylic acid salt. The polymer may be a partially neutralized or partially saponified one in which an unneutralized or unsaponified carboxylic acid group or carboxylic acid ester group is present.

For the copolymerization of a styrene monomer and/or a styrene (co)polymer and an ethylenically unsaturated carboxylic acid, an anhydride thereof or an unsaturated ester thereof, various processes hitherto known are available. For example, a process comprising melting the styrene (co)polymer and adding a copolymerizable monomer to perform copolymerization and a process comprising dissolving the styrene monomer in a solvent and adding a copolymerizable monomer to perform copolymerization are employable. In either process, it is preferable to carry out the reaction in the presence of a radical reaction initiator in order to efficiently copolymerize the copolymerizable monomer.

The amount of the monomer, such as the unsaturated carboxylic acid, its anhydride or its ester, which is introduced into the styrene/unsaturated acid compound copolymer, is in the range of preferably 0.01 to 10 mmol equivalents, particularly preferably 0.01 to 5 mmol equivalents, in terms of —COO— group, based on 1 g of the polymer.

The molecular weight of the styrene/unsaturated acid compound copolymer is desired to be in the range of 0.005 to 5 dl/g, preferably 0.01 to 3 dl/g, when expressed in terms of intrinsic viscosity [η] (135° C., solvent: decalin).

The basic substance used for the neutralization and the saponification of the styrene/unsaturated acid compound copolymer can be the same basic substance as used for the neutralization and the saponification of the carboxylic acid-modified thermoplastic polymer (b-1).

(c) Nitrogen Compound

The nitrogen compound (c) for use in the invention can be represented by the following formula (I):

(I)

wherein $R^1$ is a group represented by —$(CH_2$—$CH_2O)_m$—H (m is 1 to 10, preferably 1 to 5), and $R^2$ is a group or an atom selected from the group consisting of a group represented by —$(CH_2$—$CH_2O)_n$—H (n is 1 to 10, preferably 1 to 5), an alkyl group of 1 to 10 carbon atoms, preferably 1 to 5 carbon atoms, an aryl group and a hydrogen atom.

Examples of the nitrogen compounds (c) represented by the above formula (I) include monoethanolamine, diethanolamine and 2-(2-aminoethoxy)ethanol.

(1) Composition Containing Olefin Thermoplastic Elastomer (a)

The chipping resistance-imparting aqueous dispersion composition (1) containing the olefin thermoplastic elastomer (a) according to the invention mainly contains a mixture obtained by dispersing a nonvolatile component (film-forming component) composed of the component (a) only, the components (a) and (b), the components (a) and (c), or the components (a), (b) and (c), in water. When the components (a) and (b) are used as the nonvolatile component (film-forming component) at least one compound (b) selected from the group consisting of the carboxylic acid-modified thermoplastic polymer (b-1) and the fatty acid compound (b-2) is used in an amount of 0.5 to 20 parts by weight based on 100 parts by weight of the olefin thermoplastic elastomer (a). In this case, as the component (b), plural kinds of the carboxylic acid-modified thermoplastic polymers (b-1) or the fatty acid compounds (b-2) may be used, or the carboxylic acid-modified thermoplastic polymer (b-1) and the fatty acid compound (b-2) may be used in combination.

When the nitrogen compound (c) is further used as the nonvolatile component (film-forming component), the nitrogen compound (c) represented by the formula (I) is used in an amount of 0.1 to 30 parts by weight based on 100 parts by weight of the olefin thermoplastic elastomer (a).

A preferred embodiment of the chipping resistance-imparting aqueous dispersion composition (1) according to the invention is a composition containing at least one compound (b) selected from the group consisting of the carboxylic acid-modified thermoplastic polymer (b-1) and the fatty acid compound (b-2) in an amount of 0.5 to 20 parts by weight, preferably 0.5 to 15 parts by weight, more preferably 1 to 10 parts by weight, based on 100 parts by weight of the olefin thermoplastic elastomer (a).

Another preferred embodiment is a composition containing at least one compound (b) selected from the group consisting of the carboxylic acid-modified thermoplastic polymer (b-1) and the fatty acid compound (b-2) in an amount of 0.5 to 20 parts by weight, preferably 0.5 to 15 parts by weight, more preferably 1 to 10 parts by weight, based on 100 parts by weight of the olefin thermoplastic elastomer (a), and containing the nitrogen compound (c) represented by the formula (I) in an amount of 0.1 to 30 parts by weight, preferably 0.1 to 10 parts by weight, more preferably 0.1 to 5 parts by weight, based on 100 parts by weight of the olefin thermoplastic elastomer (a).

In the above cases, as the component (b), plural kinds of the carboxylic acid-modified thermoplastic polymers (b-1) or the fatty acid compounds (b-2) maybe used, or the carboxylic acid-modified thermoplastic polymer (b-1) and the fatty acid compound (b-2) may be used in combination.

The chipping resistance-imparting aqueous dispersion composition (1) of the invention is a dispersion of the component (a), the components (a) and (b), the components (a) and (c), or the components (a), (b) and (c), in water. This aqueous dispersion may be prepared by emulsifying the above-mentioned resins and compounds in the above-mentioned prescribed ratio at once, or may be obtained by emulsifying each component and then mixing the resulting emulsions in the above-mentioned prescribed ratio. The water content in the dispersion is in the range of usually 10 to 500 parts by weight, preferably 50 to 300 parts by weight, based on 100 parts by weight of the component (a), the total of the components (a) and (b), the total of the components (a) and (c), or the total of the components (a), (b) and (c).

Preparation of Composition (1) Containing Olefin Thermoplastic Elastomer (a)

The chipping resistance-imparting aqueous dispersion composition (1) containing the olefin thermoplastic elastomer (a) in the invention is prepared by, for example, a process (i) comprising kneading the olefin thermoplastic elastomer (a) with at least one compound (b) selected from the group consisting of the carboxylic acid-modified thermoplastic polymer (b-1) and the fatty acid compound (b-2), then adding the nitrogen compound (c) represented by the formula (I), the basic substance and water to the kneadate, and further melt kneading them to perform neutralization and/or saponification and dispersing of the components (a), (b) and (c) in the aqueous phase (phase inversion), or a process (ii) comprising previously adding the nitrogen compound (c) represented by the formula (I), the basic substance and water to the carboxylic acid-modified thermoplastic polymer (b-1) and/or the fatty acid compound (b-2) to perform neutralization and/or saponification, kneading the reaction mixture with the olefin thermoplastic elastomer (a), then further adding water, and melt kneading the resulting mixture to perform dispersing of the components (a), (b) and (c) in the aqueous phase (phase inversion).

Of the above processes, the process (i) is preferable because the process is simple and a nonvolatile component (film-forming component) having small particle size and uniform particle size distribution can be obtained. As the melt kneading means used for the phase inversion, any means publicly known is employable, but preferable is, for example, a kneader, a Banbury mixer or a multi-screw extruder.

In the aqueous dispersion obtained through the melt kneading and the phase inversion, about 3 to 25% of water is generally contained, and the aqueous dispersion of this water content can be used as it is. If the viscosity is so high that the workability is lowered, water may be replenished prior to use.

In the chipping resistance-imparting aqueous dispersion composition (1) of the invention, the average particle size of the nonvolatile component (film-forming component) in water is in the range of preferably 0.01 to 5 μm, more preferably 0.1 to 2 μm.

(2) Composition Containing Styrene/Conjugated Diene Block Copolymer or its Hydrogenation Product (a')

The composition (2) containing the styrene/conjugated diene block copolymer or its hydrogenation product (a'), said composition being another embodiment of the invention, mainly contains a mixture of water and the component (a') only, the components (a') and (b'), the components (a') and (c), or the components (a'), (b') and (c). In case of the resin composition of the components (a') and (b'), at least one compound (b') selected from the group consisting of the carboxylic acid-modified thermoplastic polymer (b-1), the fatty acid compound (b-2) and the styrene/unsaturated acid compound copolymer (b-3) is used in an amount of 0.5 to 20 parts by weight based on 100 parts by weight of the styrene/conjugated diene block copolymer or its hydrogenation product (a'). In this case, as the component (b'), plural kinds of the carboxylic acid-modified thermoplastic polymers (b-1), the fatty acid compounds (b-2) or the styrene/unsaturated acid compound copolymers (b-3) may be used, or the carboxylic acid-modified thermoplastic polymer (b-1), the fatty acid compound (b-2) and the styrene/unsaturated acid compound copolymer (b-3) may be used in combination.

The chipping resistance-imparting aqueous dispersion composition (2) of the invention is a composition containing at least one compound (b') selected from the group consisting of the carboxylic acid-modified thermoplastic polymer (b-1), the fatty acid compound (b-2) and the styrene/unsaturated acid compound copolymer (b-3) in an amount of usually 0.5 to 20 parts by weight, preferably 0.5 to 15 parts by weight, more preferably 1 to 10 parts by weight, based on 100 parts by weight of the styrene/conjugated diene block copolymer or its hydrogenation product (a').

When the nitrogen compound (c) is used as the nonvolatile component (film-forming component), the nitrogen compound (c) represented by the formula (I) is used in an amount of 0.1 to 30 parts by weight based on 100 parts by weight of the styrene/conjugated diene block copolymer or its hydrogenation product (a').

A preferred embodiment of the chipping resistance-imparting aqueous dispersion composition (2) according to the invention is a composition further containing the nitrogen compound (c) represented by the formula (I) in an amount of usually 0.1 to 30 parts by weight, preferably 0.1 to 10 parts by weight, more preferably 0.1 to 5 parts by weight, based on 100 parts by weight of the styrene/conjugated diene block copolymer or its hydrogenation product (a'), in addition to the component (b').

In the above case, as the component (b'), plural kinds of the carboxylic acid-modified thermoplastic polymers (b-1), the fatty acid compounds (b-2) or the styrene/unsaturated acid compound copolymers (b-3) may be used, or the carboxylic acid-modified thermoplastic polymer (b-1), the fatty acid compound (b-2) and the styrene/unsaturated acid compound copolymer (b-3) may be used in combination.

The chipping resistance-imparting aqueous dispersion composition (2) of the invention is a dispersion of the component (a'), the components (a') and (b'), the components (a') and (c), or the components (a'), (b') and (c), in water. This aqueous dispersion may be prepared by emulsifying the above-mentioned nonvolatile components (film-forming components) in the above-mentioned prescribed ratio at once, or may be obtained by emulsifying each nonvolatile component (film-forming component) and then mixing the resulting emulsions in the above-mentioned prescribed ratio. The water content in the dispersion is in the range of usually 10 to 500 parts by weight, preferably 50 to 300 parts by weight, based on 100 parts by weight of the component (a'), the total of the nonvolatile components (film-forming components) comprising (a') and (b'), the total of the nonvolatile components (film-forming components) comprising (a') and (c), or the total of the nonvolatile components (film-forming components) comprising (a'), (b') and further (c).

Preparation of Composition (2) Containing Styrene/Conjugated Diene Block Copolymer or its Hydrogenation Product (a')

The styrene/conjugated diene block copolymer or its hydrogenation product (a') and at least one compound (b') selected from the group consisting of the carboxylic acid-modified thermoplastic polymer (b-1), the fatty acid compound (b-2) and the styrene/unsaturated acid compound copolymer (b-3) can be stably dispersed in water by various processes.

For example, there are a process (iii) comprising kneading the above-mentioned desired components, then adding the basic substance and water, and further melt kneading the resulting mixture to perform neutralization and/or saponification and dispersing of the styrene/conjugated diene block copolymer or its hydrogenation product (a') in the aqueous phase (phase inversion), and a process (iv) comprising previously adding the basic substance and water to the carboxylic acid-modified thermoplastic polymer (b-1) and/or the fatty acid compound (b-2) and/or the styrene/unsaturated compound copolymer (b-3) to perform neutralization and/or saponification, kneading the reaction mixture with the styrene/conjugated diene block copolymer or its hydrogenation product (a'), then adding water, and melt kneading the resulting mixture to perform dispersing of the styrene/conjugated diene block copolymer or its hydrogenation product (a') in the aqueous phase (phase inversion). Of the above processes, the process (iii) is preferable because the process is simple and a nonvolatile component (film-forming component) having small particle size and uniform particle size distribution can be obtained. As the melt kneading means used for the phase inversion, any means publicly known is employable, and preferable is, for example, a kneader, a Banbury mixer or a multi-screw extruder.

In the aqueous dispersion obtained through the melt kneading and the phase inversion, about 3 to 25% of water is generally contained, and the aqueous dispersion of this water content can be used as it is. If the viscosity is so high that the workability is lowered, water may be replenished prior to use.

The process comprising melting the nonvolatile component (film-forming component) consisting of the copolymer (a') and the optionally added component (b') and then adding water to stably disperse the nonvolatile component (film-forming component) in water as mentioned above is described in detail in, for example, Japanese Patent Laid-Open Publication No. 13984/1998.

In the chipping resistance-imparting aqueous dispersion composition (2) of the invention, the average particle size of the nonvolatile component (film-forming component) in water is in the range of preferably 0.01 to 5 μm, more preferably 0.1 to 2 μm.

Other Additives

In order to improve the dispersing stability and control the viscosity, to the chipping resistance-imparting aqueous dispersion composition of the invention can be added organic thickening agents, such as polyvinyl alcohol, polyvinyl pyrrolidone, polyvinyl methyl ether, polyethylene oxide, polyacrylamide, polyacrylic acid, carboxymethyl cellulose, methyl cellulose, hydroxyethyl cellulose and poly(N-vinylacetamide), and inorganic thickening agents, such as silicon dioxide, activated clay and bentonite.

In order to improve the stability of the aqueous dispersion, surface active agents can be employed. Examples of the surface active agents include:

anionic surface active agents, such as alkylnaphthalene-sulfonic acid salt, naphthalenesulfonic acid salt, sodium dodecylbenzenesulfonate, sodium laurylsulfate, sodium salt of formaldehyde condensate, sodium alkyldiphenylether disulfonate, calcium lignin sulfonate, melamine resin sulfonic acid sodium salt, special polyacrylic acid salt, gluconic acid salt, olefin/maleic acid copolymer, carboxymethyl cellulose sodium salt, potassium oleate, sodium oleate, calcium stearate, potassium stearate, stearic acid triethanolamine, beef tallow acid potassium salt, beef tallow acid sodium salt and metallic soap (Zn, Al, Na or K salt);

nonionic surface active agents, such as fatty acid monoglyceride, sorbitan fatty acid ester, polyoxyethylene alkyl ether, polyoxyethylene alkylene alkylphenyl ether, polyoxyethylene sorbitan fatty acid partial ester, polyoxyethylene sorbitol fatty acid partial ester, polyoxyethylene glycerol fatty acid partial ester, polyoxyethylene fatty acid amine, polyoxyethylene (hardened) castor oil, polyoxyethylene glycol fatty acid ester, polyoxyethylene/polyoxypropylene block copolymer, hydroxyethyl cellulose, polyvinyl alcohol, polyvinyl pyrrolidone and methyl cellulose;

amphoteric surface active agents, such as alkylammonium chloride, trimethylalkylammonium bromide, alkylpyridinium chloride and casein; and water-soluble polyvalent metallic salts.

These surface active agents can be used singly or as a mixture of two or more kinds.

Formation of Coating Film

The chipping resistance-imparting aqueous dispersion composition of the invention can be applied as it is to form a layer having chipping resistance, or can be used as a chipping resistance-imparting additive to be added to automotive intermediate coating materials or finish coating materials such as top coating materials. When the chipping resistance-imparting aqueous dispersion composition of the invention is used as it is, the aimed surface is coated with an undercoating material such as an automotive undercoating electrodeposition paint, then the undercoated surface is coated with the composition of the invention prior to finish coating to form a layer having chipping resistance, and then finish coating is carried out on the layer having chipping resistance, whereby a composite coating film having chipping resistance can be formed. The thickness of the layer having chipping resistance thus formed is desired to be in the range of 1 to 10 μm, preferably 1 to 4 μm, in terms of a dry film thickness. The chipping resistance-imparting aqueous dispersion composition of the invention can be used by blending it with a finish coating material. In this case, the chipping resistance-imparting aqueous dispersion composition of the invention is added in an amount of 1 to 20% by weight, preferably 5 to 10% by weight, in terms of solid content, based on 100% by weight of the resin solid content contained in the finish coating material. The thus blended coating material is applied in a thickness (in terms of dry film thickness) of usually 10 to 100 μm, preferably 10 to 50 μm, whereby excellent chipping resistance can be exhibited.

Even if the chipping resistance-imparting aqueous dispersion composition of the invention is used, properties of the coating film, such as appearance, adhesion properties, heat resistance, moisture resistance and gasoline resistance, are not lowered.

EXAMPLES

The present invention is further described with reference to the following examples, but it should be construed that the invention is in no way limited to those examples.

Preparation Example 1

Preparation of Aqueous Dispersion Composition Comprising Ethylene/Propylene Copolymer (a)-1 and Carboxylic Acid-modified Thermoplastic Polymer (b-1)

100 Parts by weight of an ethylene/propylene copolymer (elastomer having ethylene/propylene molar ratio of 4/6, MFR (230° C.): 2.0 g/10 min), 10 parts by weight of a maleic anhydride-modified polyethylene wax (graft quantity: 3% by weight, —COO— group: 0.67 mmol/g-polymer, [η] (135° C., solvent: decalin): 0.16 dl/g) and 2 parts by weight of potassium oleate were mixed. The mixture was fed through a hopper of a twin-screw extruder (Ikegai Tekkosho PCM-30, L/D=40) at a rate of 3000 g/hr, and at the same time, a 10% aqueous solution of potassium hydroxide was continuously fed through a feed nozzle provided in the vent zone of the extruder at a rate of 240 g/hr, followed by continuously extruding the resin mixture at a heating temperature of 230° C. The thus extruded resin mixture was cooled down to 900° C. by a jacketed static mixer provided at the extruder port and introduced into hot water of 80° C. to obtain an aqueous dispersion having a solid concentration of 45% and pH of 10 in a yield of 99%. Measurement of an average particle size of the aqueous dispersion by a microtrack resulted in 0.8 μm.

Preparation Example 2

Preparation of Aqueous Dispersion Composition Comprising Ethylene/Octene Copolymer (a)-2 and Carboxylic Acid-modified Thermoplastic Polymer (b-1)

An aqueous dispersion composition having a solid concentration of 45%, pH of 10 and an average particle size of 0.3 μm was obtained in a yield of 99% in the same manner as in Preparation Example 1, except that an ethylene/octene copolymer (elastomer having ethylene/octene molar ratio of 85/15, MFR (230° C.): 150 g/10 min) was used instead of the ethylene/propylene copolymer.

Preparation Example 3

Preparation of Aqueous Dispersion Composition Comprising Ethylene/Propylene Copolymer (a)-1, Carboxylic Acid-modified Thermoplastic Polymer (b-1) and 2-(2-aminoethoxy)ethanol (c)

An aqueous dispersion composition having a solid concentration of 44.8%, pH of 10.5 and an average particle size of 0.8 μm was obtained by adding 2-(2-aminoethoxy)ethanol (available from Huntsman, Diglycolamine) to the aqueous dispersion composition prepared in Preparation Example 1 in an amount of 1% by weight based on 100% by weight of the resin solid content in the aqueous dispersion composition.

Preparation Example 4

Preparation of Aqueous Dispersion Composition Comprising Ethylene/Octene Copolymer (a)-2, Carboxylic Acid-modified Thermoplastic Polymer (b-1) and 2-(2-aminoethoxy)ethanol (c)

An aqueous dispersion composition having a solid concentration of 44.8%, pH of 10.5 and an average particle size of 0.3 μm was obtained by adding 2-(2-aminoethoxy)ethanol (available from Huntsman, Diglycolamine) to the aqueous dispersion composition prepared in Preparation Example 2 in an amount of 1% by weight based on 100% by weight of the resin solid content in the aqueous dispersion composition.

Preparation Example 5

Preparation of Aqueous Dispersion Composition Comprising Ethylene/Propylene Copolymer (a)-1 and Fatty Acid Compound (b-2)

An aqueous dispersion composition having a solid concentration of 45%, pH of 10.5 and an average particle size of 1.0 μm was obtained in a yield of 99% in the same manner as in Preparation Example 1, except that 3 parts by weight of montan wax (available from Clariant, Hoechst Wax S, number of carbon atoms: 28–32, —COO— group: 2.6 mmol/g-montan wax, [η] (135° C., solvent: decalin): 0.05 dl/g) was used instead of 10 parts by weight of the maleic anhydride-modified polyethylene wax.

(1) Use of Composition as Chipping-resistant Aqueous Primer

Examples 1 to 5

A steel plate was subjected to surface treatment with a known electrodeposition epoxy paint (thickness: about 20 μm). To the electrodeposition painted surface of the steel plate, the aqueous dispersion (chipping resistance-imparting aqueous dispersion composition of the invention) prepared by each of Preparation Examples 1 to 5 was applied so as to obtain a dry film thickness of 5 μm, followed by drying at room temperature (25° C.±10° C.). Then, the chipping resistance-imparting aqueous dispersion coating film surface was coated with a modified polyester alkyd resin/iminomethylol type amino resin water paint by an air spray in a thickness of about 30 μm, followed by thermal hardening at 140° C. for 30 minutes, to prepare a test sample.

Each sample was evaluated on the paint film appearance, adhesion properties, heat resistance, moisture resistance, gasoline resistance and chipping resistance. The results are set forth in Table 1.

Comparative Example 1

A test sample was prepared under the same conditions as in Example 1, except that a coating film of the chipping resistance-imparting aqueous dispersion was not formed. The test sample was subjected to the same evaluation as in Example 1. The results are set forth in Table 1.

(2) Use of Composition as Chipping Resistance-imparting Additive

Examples 6 to 10

A steel plate was subjected to surface treatment with a known electrodeposition epoxy paint (thickness: about 20 μm). The electrodeposition painted surface of the steel plate was coated with a paint, which had been obtained by adding the aqueous dispersion (chipping resistance-imparting aqueous dispersion composition of the invention) prepared by each of Preparation Examples 1 to 5 to a modified polyester alkyd resin/iminomethylol type amino resin water paint in an amount of 10% by weight based on 100% by weight of the resin solid content in the water paint, by an air spray so as to obtain a dry film thickness of about 30 μm, followed by thermal hardening at 140° C. for 30 minutes, to prepare a test sample.

Each sample was evaluated on the paint film appearance, adhesion properties, heat resistance, moisture resistance, gasoline resistance and chipping resistance. The results are set forth in Table 2.

Comparative Example 2

A test sample was prepared under the same conditions as in Example 6, except that the chipping resistance-imparting aqueous dispersion was not added to the paint. The test sample was subjected to the same evaluation as in Example 6. The results are set forth in Table 2.

Preparation Example 6

Preparation of Aqueous Dispersion Composition Comprising Styrene/Isoprene/Styrene Triblock Copolymer Hydrogenation Product (a')-1 and Carboxylic Acid-modified Thermoplastic Polymer (b-1)

100 Parts by weight of a styrene/isoprene/styrene triblock copolymer hydrogenation product (available from Kuraray Co., Ltd., trade name: Septon 2002), 10 parts by weight of a maleic anhydride-modified polyethylene wax (graft quantity: 3% by weight, —COO— group: 0.67 mmol/g-polymer, [η] (135° C., solvent: decalin): 0.16 dl/g) and 2 parts by weight of potassium oleate were mixed. The mixture was fed through a hopper of a twin-screw extruder (Ikegai Tekkosho PCM-30, L/D=40) at a rate of 3000 g/hr, and at the same time, a 10% aqueous solution of potassium hydroxide was continuously fed through a feed nozzle provided in the vent zone of the extruder at a rate of 240 g/hr, followed by continuously extruding the resin mixture at a heating temperature of 230° C. The thus extruded resin mixture was cooled down to 90° C. by a jacketed static mixer provided at the extruder port and introduced into hot water of 80° C. to obtain an aqueous dispersion having a solid concentration

Preparation Example 7

Preparation of Aqueous Dispersion Composition Comprising Styrene/Butadiene/Styrene Triblock Copolymer Hydrogenation Product (a')-2 and Carboxylic Acid-modified Thermoplastic Polymer (b-1)

An aqueous dispersion composition having a solid concentration of 45%, pH of 10 and an average particle size of 0.5 µm was obtained in a yield of 99% in the same manner as in Preparation Example 6, except that a styrene/butadiene/styrene triblock copolymer hydrogenation product (available from Asahi Chemical Industry Co., Ltd., Toughtec H1141) was used instead of the styrene/isoprene/styrene triblock copolymer hydrogenation product.

Preparation Example 8

Preparation of Aqueous Dispersion Composition Comprising Styrene/Isoprene/Styrene Triblock Copolymer Hydrogenation Product (a')-1, Carboxylic Acid-modified Thermoplastic Polymer (b-1) and 2-(2-aminoethoxy)ethanol (c)

An aqueous dispersion composition having a solid concentration of 44.8%, pH of 10.5 and an average particle size of 0.5 µm was obtained by adding 2-(2-aminoethoxy)ethanol (available from Huntsman, Diglycolamine) to the aqueous dispersion composition prepared in Preparation Example 6 in an amount of 1% by weight based on 100% by weight of the resin solid content in the aqueous dispersion composition.

Preparation Example 9

Preparation of Aqueous Dispersion Composition Comprising Styrene/Butadiene/Styrene Triblock Copolymer Hydrogenation Product (a')-2, Carboxylic Acid-modified Thermoplastic Polymer (b-1) and 2-(2-aminoethoxy)ethanol (c)

An aqueous dispersion composition having a solid concentration of 44.8%, pH of 10.5 and an average particle size of 0.5 µm was obtained by adding 2-(2-aminoethoxy)ethanol (available from Huntsman, Diglycolamine) to the aqueous dispersion composition prepared in Preparation Example 7 in an amount of 1% by weight based on 100% by weight of the resin solid content in the aqueous dispersion composition.

Preparation Example 10

Preparation of Aqueous Dispersion Composition Comprising Styrene/Isoprene/Styrene Triblock Copolymer Hydrogenation Product (a')-1 and Fatty Acid Compound (b-2)

An aqueous dispersion composition having a solid concentration of 45%, pH of 11 and an average particle size of 0.8 µm was obtained in a yield of 99% in the same manner as in Preparation Example 6, except that 3 parts by weight of montan wax (available from Clariant, Hoechst Wax S, number of carbon atoms: 28–32, —COO— group: 2.6 mmol/g-montan wax, intrinsic viscosity [η] (135° C., solvent: decalin): 0.05 dl/g) was used instead of 10 parts by weight of the maleic anhydride-modified polyethylene wax.

Preparation Example 11

Preparation of Aqueous Dispersion Composition Comprising Styrene/Isoprene/Styrene Triblock Copolymer Hydrogenation Product (a')-1 and Styrene/Unsaturated Acid Compound Copolymer (b-3)

An aqueous dispersion composition having a solid concentration of 45%, pH of 10.5 and an average particle size of 0.7 µm was obtained in a yield of 99% in the same manner as in Preparation Example 6, except that 3 parts by weight of a styrene/maleicanhydride copolymer (Elf Atochem SMA3000P, —COO— group: 4.6 mmol/g-polymer, intrinsic viscosity [η] (135° C., solvent: decalin): 0.09 dl/g) was used instead of 10 parts by weight of the maleic anhydride-modified polyethylene wax.

(1) Use of Composition as Chipping-Resistant Aqueous Primer

Examples 11 to 16

A steel plate was subjected to surface treatment with a known electrodeposition epoxy paint (thickness: about 20 µm). To the electrodeposition painted surface of the steel plate, the aqueous dispersion (chipping resistance-imparting aqueous dispersion composition of the invention) prepared by each of Preparation Examples 6 to 11 was applied so as to obtain a dry film thickness of 5 µm, followed by drying at room temperature. Then, the chipping resistance-imparting aqueous dispersion coating film surface was coated with a modified polyester alkyd resin/iminomethylol type amino resin water paint by an air spray in a thickness of about 30 µm, followed by thermal hardening at 140° C. for 30 minutes, to prepare a test sample.

Each sample was evaluated on the paint film appearance, adhesion properties, heat resistance, moisture resistance, gasoline resistance and chipping resistance. The results are set forth in Table 3.

Comparative Example 3

A test sample was prepared under the same conditions as in Example 11, except that a coating film of the chipping resistance-imparting aqueous dispersion was not formed. The test sample was subjected to the same evaluation as in Example 11. The results are set forth in Table 3.

(2) Use of Composition as Chipping Resistance-imparting Additive

Examples 17 to 22

A steel plate was subjected to surface treatment with a known electrodeposition epoxy paint (thickness: about 20 µm). The electrodeposition painted surface of the steel plate was coated with a paint, which had been obtained by adding the aqueous dispersion (chipping resistance-imparting aqueous dispersion composition of the invention) prepared by each of Preparation Examples 6 to 11 to a modified polyester alkyd resin/iminomethylol type amino resin water paint in an amount of 10% by weight based on 100% by weight of the resin solid content in the water paint, by an air spray so as to obtain a dry film thickness of about 30 µm, followed by thermal hardening at 140° C. for 30 minutes, to prepare a test sample.

Each sample was evaluated on the paint film appearance, adhesion properties, heat resistance, moisture resistance, gasoline resistance and chipping resistance. The results are set forth in Table 4.

Comparative Example 4

A test sample was prepared under the same conditions as in Example 17, except that the chipping resistance-imparting aqueous dispersion was not added to the paint. The test sample was subjected to the same evaluation as in Example 17. The results are set forth in Table 4.

Evaluation of the paint film appearance, adhesion properties, heat resistance, moisture resistance, gasoline resistance and chipping resistance was carried out in accordance with the following methods.

Evaluation Methods

The paint film properties of the test samples prepared in the examples and the comparative examples were evaluated in accordance with the following methods. The symbol "AA" denotes good, and the symbol "BB" denotes bad.

(1) Film Appearance

The film appearance of the test sample was measured by an optical surface profile measuring machine (Kobe Seikosha super i). A test sample having a surface index of not more than 30 was taken as good.

(2) Adhesion Properties

Using a multicross cutter, plural parallel lines were drawn on the paint film surface of the test sample in the lengthwise and the crosswise directions at an equal distance of 1 mm with lightly reaching the base, to form 100 squares of 1 mm$^2$. To the thus treated surface, a cellophane adhesive tape having an enough width was stuck, and the tape was peeled upward at a breath. Then, the number of squares free from peeling of the painted surface was examined. A test sample having all the squares (100 squares) free from peeling of the painted surface was taken as good.

(3) Heat Resistance

The test sample was allowed to stand for 500 hours at 90° C. in a constant temperature bath and then allowed to stand at room temperature for 24 hours. Then, the paint film appearance and the change of the painted surface due to heat such as discoloration, gloss or sink mark were examined. A test sample having no change was taken as good.

(4) Moisture Resistance

The test sample was adjusted to have a temperature of 50±1° C. and a relative humidity of not less than 98% by the use of a temperature- and humidity-controllable closed box, and the sample was placed horizontally. Then, occurrence of blisters and change of blisters were examined every 24 hours over a period of 240 hours. A test sample having no change was taken as good.

(5) Gasoline Resistance

On a surface of the test sample, about 0.5 to 0.8 ml of gasoline was dropped, and the sample was allowed to stand for 4 hours in a testing laboratory. Then, the gasoline was wiped off, and immediately the paint film was examined on lowering of gloss, occurrence of stains, softening, peeling, and occurrence of cracks. A test sample having no change was taken as good.

(6) Chipping Resistance (Scattering Stone Test)

Mar resistance of the paint film was tested by a gravelometer method. First, crushed stones of No. 7 (defined by JISA5001-7 (road crushed stone)) were used as shot materials.

The test sample was set at the prescribed position of a gravelometer so that the shot materials could hit the sample at an angle of 90°. Then, 250 g of the shot materials were placed in the gravelometer controlled to an air pressure of 4.0 kg/cm$^2$, and the air valve was opened to discharge the shot materials against the test sample. After the discharge, the test sample was taken out, and a cellophane adhesive tape was stuck to the painted surface of the sample. Then, peeling of the painted surface was examined and evaluated on the basis of 5 points. A test sample of 4 points or more was taken as good.

TABLE 1

|  | Ex. 1 | Ex. 2 | Ex. 3 | Ex. 4 | Ex. 5 | Comp. Ex. 1 |
|---|---|---|---|---|---|---|
| Film appearance | AA | AA | AA | AA | AA | AA |
| Adhesion properties | AA | AA | AA | AA | AA | AA |
| Heat resistance | AA | AA | AA | AA | AA | AA |
| Moisture resistance | AA | AA | AA | AA | AA | AA |
| Gasoline resistance | AA | AA | AA | AA | AA | AA |
| Chipping resistance | AA | AA | AA | AA | AA | BB |

TABLE 2

|  | Ex. 6 | Ex. 7 | Ex. 8 | Ex. 9 | Ex. 10 | Comp. Ex. 2 |
|---|---|---|---|---|---|---|
| Film appearance | AA | AA | AA | AA | AA | AA |
| Adhesion properties | AA | AA | AA | AA | AA | AA |
| Heat resistance | AA | AA | AA | AA | AA | AA |
| Moisture resistance | AA | AA | AA | AA | AA | AA |
| Gasoline resistance | AA | AA | AA | AA | AA | AA |
| Chipping resistance | AA | AA | AA | AA | AA | BB |

TABLE 3

|  | Ex. 11 | Ex. 12 | Ex. 13 | Ex. 14 | Ex. 15 | Ex. 16 | Comp. Ex. 3 |
|---|---|---|---|---|---|---|---|
| Film appearance | AA | AA | AA | AA | AA | AA | AA |
| Adhesion properties | AA | AA | AA | AA | AA | AA | AA |
| Heat resistance | AA | AA | AA | AA | AA | AA | AA |
| Moisture resistance | AA | AA | AA | AA | AA | AA | AA |
| Gasoline resistance | AA | AA | AA | AA | AA | AA | AA |
| Chipping resistance | AA | AA | AA | AA | AA | AA | BB |

TABLE 4

|  | Ex. 17 | Ex. 18 | Ex. 19 | Ex. 20 | Ex. 21 | Ex. 22 | Comp. Ex. 4 |
|---|---|---|---|---|---|---|---|
| Film appearance | AA | AA | AA | AA | AA | AA | AA |
| Adhesion properties | AA | AA | AA | AA | AA | AA | AA |
| Heat resistance | AA | AA | AA | AA | AA | AA | AA |
| Moisture resistance | AA | AA | AA | AA | AA | AA | AA |
| Gasoline resistance | AA | AA | AA | AA | AA | AA | AA |

TABLE 4-continued

| | Ex. 17 | Ex. 18 | Ex. 19 | Ex. 20 | Ex. 21 | Ex. 22 | Comp. Ex. 4 |
|---|---|---|---|---|---|---|---|
| Chipping resistance | AA | AA | AA | AA | AA | AA | BB |

INDUSTRIAL APPLICABILITY

The chipping resistance-imparting aqueous dispersion composition of the invention is a dispersion wherein a resin composition containing an olefin thermoplastic elastomer or a styrene/conjugated diene block copolymer or its hydrogenation product is dispersed in water. By the use of the aqueous dispersion composition as an aqueous primer or an additive to a water paint, the resulting paint film is excellent in chipping resistance as well as in other properties such as film appearance, adhesion properties, heat resistance, moisture resistance and gasoline resistance. Hence, the industrial applicability of the aqueous dispersion composition is high.

What is claimed is:

1. A chipping resistance-imparting aqueous dispersion composition comprising a nonvolatile film forming component dispersed in water, said nonvolatile component containing a styrene/conjugated diene block copolymer or its hydrogenation product (a'), at least one compound (b') selected from the group consisting of a carboxylic acid-modified thermoplastic polymer (b-1) and a styrene/unsaturated acid compound copolymer (b-3) in an amount of 0.5 to 20 parts by weight based on 100 parts by weight of the styrene/conjugated diene block copolymer or its hydrogenation product (a'), and further a nitrogen compound (c) represented by the following formula (I) in an amount of 0.1 to 30 parts by weight based on 100 parts by weight of the styrene/conjugated diene block copolymer or its hydrogenation product (a'),

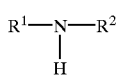
(I)

wherein $R^1$ is a group represented by $-(CH_2-CH_2O)_m-H$ (m is 1 to 10), and $R^2$ is a group or an atom selected from the group consisting of a group represented by $-(CH_2-CH_2O)_n-H$ (n is 1 to 10), an alkyl group of 1 to 10 carbon atoms, an aryl group and a hydrogen atom.

2. A chipping resistance-imparting aqueous dispersion composition, comprising a nonvolatile film forming component dispersed in water, said nonvolatile component consisting of a styrene/conjugated diane block copolymer or its hydrogenation product (a'), and at least one compound (b') selected from the group consisting of a carboxylic acid-modified thermoplastic polymer (b-1) and a styrene/unsaturated acid compound copolymer (b-3) in an amount of 0.5 to 20 parts by weight based on 100 parts by weight of the styrene/conjugated diene block copolymer or its hydrogenation product (a').

3. A chipping resistance-imparting aqueous dispersion composition comprising a nonvolatile film forming component dispersed in water, said nonvolatile component consisting of a styrene/conjugated diene block copolymer or its hydrogenation product (a'), and a nitrogen compound (c) represented by the following formula (I) in an amount of 0.1 to 30 parts by weight based on 100 parts by weight of the styrene/conjugated diane block copolymer or its hydrogenation product (a'),

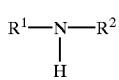
(I)

wherein $R^1$ is a group represented by $-(CH_2-CH_2O)_m-H$ (m is 1 to 10), and $R_2$ is a group or an atom selected from the group consisting of a group represented by $-(CH_2-CH_2O)_n-H$ (n is 1 to 10), an alkyl group of 1 to 10 carbon atoms, an aryl group and a hydrogen atom.

* * * * *